Figure 1:
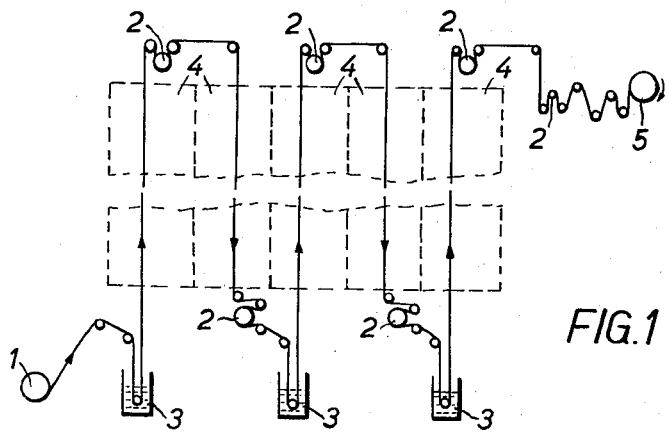

Oct. 27, 1959 R. ENGELHARDT 2,909,809
METHOD OF PRODUCING ELECTRICALLY INSULATING FOILS
Filed Aug. 17, 1955

INVENTOR.
RUDOLF ENGELHARDT
BY Elmer P. Rucker
ATTORNEY

2,909,809
METHOD OF PRODUCING ELECTRICALLY INSULATING FOILS

Rudolf Engelhardt, Leverkusen, Germany, assignor, by direct and mesne assignments, of one-half to Mobay Chemical Company, Pittsburgh, Pa., a corporation of Delaware, and one-half to Farbenfabriken Bayer Aktiengesellschaft, Leverkusen, Germany, a corporation of Germany Application August 17, 1955, Serial No. 528,989

Claims priority, application Germany August 19, 1954

4 Claims. (Cl. 18—57)

The present invention relates to process of producing electric insulating foils. Electrically insulating layers of polyurethanes, such as polyesterdiisocyanate addition products, are already known in the electrical insulation art. Such insulating layers may be applied to the conductors by the conventional dipping processes, the thicknesses of the layers varying according to the dilution of the solutions of the film-forming components. These layers have good dielectric and mechanical properties. The bonding strength with the metal support is to be particularly emphasised.

On account of the molecular structure of these polyurethanes, it was presumed that foils produced therefrom could not be usefully employed as self-supporting materials, since it was not to be expected that sufficient tensile strengths could be obtained for the coverings of conductors, for wrapping condenser coatings and the like. Furthermore, it also appeared impossible for the free-supporting foil to be produced by means of continuous processes usually employed with plastics, such as a casting process, due to the bonding strength on the metallic tape, or a calender rolling process, due to the low plasticity of the raw material.

It has now been found that existing prejudices may be overcome by a thin foil of polyurethanes, for example $1\text{--}30\mu$ in thickness, produced from, for example, polyesters and polyisocyanates, such a foil having such a tensile strength that it is self-supporting. It has the same strength as an aluminum foil of the same thickness used in condenser construction. This plastic foil may therefore be worked on the machines used for the manufacture of condenser windings. A foil with a thickness of $16\mu$ has a tensile strength of 7 kg./mm.$^2$, while a foil which is $3\mu$ thick still has a tensile strength of 4.1 kg./mm.$^2$. The thicker foil, the tensile strength of which is only 30% lower than that of a cable paper with a thickness of $55\mu$, is very suitable as a covering for a conductor. Condenser windings may be produced with the thin foil. Such condensers, in which the foil serves as dielectric, have an extraordinarily high capacity for the potential range adapted to its thickness, this being of the order of 13–1500 pf./cm.$^2$ with a foil which is $3\mu$ thick. This capacity of 2–3000 pf./cm.$^2$ when the foil is $1\frac{1}{2}\mu$ thick. Its voltage resistance is 200–250 v./$\mu$. It is possible to reduce the thickness of the foil to such an extent that an optimum between self-supporting strength and insulating effect is obtained.

Example 1

An aluminum foil $6\mu$ in thickness is passed through a solution the composition of which is given hereinafter, and heated in a vertical drying channel at temperatures rising from 150–300° C., whereby polycondensation to the plastics takes place on the metallic surface. The procedure can be repeated seevral times to enlarge the thickness of the foil. By enlarging the number of single sheets the dielectric properties, particularly the dielectric strength will be increased.

Composition of the dipping solution:

(a) 4.25 kg. of a polyester prepared from 2.5 mols of adipic acid, 0.5 mol of phthalic acid and 4 mols of hexanetriol are dissolved in
    4.33 l. of methylene chloride
    12.5 l. of ethylene chloride
    11.0 l. of ethyl acetate (b) 8.5 kg. of an adduct of 3 mols of toluylene diisocyanate and 1 mol of hexanetriol are dissolved in
    5 l. of methylene chloride
    7 l. of toluene
    7 l. of ethyl acetate
    10 l. of chlorobenzene With a runing time of 4 m./1 min. a film $6\mu$ in thickness is obtained on each side of the metal tape. Stoving temperature 190° C.

Example 2

In the procedure according to Example 1, the following dipping solution can be likewise employed:

(a) 2.125 kg. of a polyester prepared from 3 mols of adipic acid and 4 mols of trimethylol propane are dissolved in
    5.5 l. of ethyl acetate
    6.25 l. of benzene, and
    3.7 l. of monomethyl glycol ether acetate (b) 4.25 kg. of a 75% ethyl acetate solution of 3 mols of tolylene diisocyanate and 1 mol of hexanetriol are mixed with
    3.5 l. of ethyl acetate
    2.5 l. of toluene
    5.0 l. of xylene
    2.3 l. of monomethyl glycol ether acetate The above solutions of the reaction components can be diluted with the following solvent mixture to obtain the desired thickness of films:

(c) 13.2 l. of ethyl acetate
    16.5 l. of benzene
    8.7 l. of monomethyl glycol ether acetate By using a mixture of $a$, $b$ and $c$ in a proportion of 1:1:4 a film $3\mu$ in thickness is obtained on each side of the metal tape. Running time 5 m./1 min. Stoving temperature 190° C.

Example 3

In the procedure according to Example 1, the following dipping solution can be likewise employed:

(a) 1.417 kg. of a polyester prepared from 0.5 mol of phthalic acid, 2.5 mols of adipic acid, 1 mol of 1,3-butylene glycol and 3 mols of trimethylol propane are dissolved in
    7.650 l. of ethyl acetate
    1.350 l. of monomethyl glycol ether acetate (b) 2.500 kg. of a 75% ethyl acetate solution of 3 mols of tolylene diisocyanate and 1 mol of hexanetriol are mixed with
    6.800 l. of ethyl acetate
    1.2 l. of monomethyl glycol ether acetate The above solutions of the reaction components can be diluted with the following solvent mixture to obtain the desired thickness of films:

(c) 75.0 l. of ethyl acetate
    15.0 l. of monomethyl glycol ether acetate

By using a mixture of $a$, $b$ and $c$ in a proportion of

1:1:9 a film 1μ in thickness is obtained. Running time 4 m./1 min. Stoving temperature 230° C.

0.5% by weight, relative to the solid contents of the solution, of a cyclohexanone solution of cellite, alkyd resins or linseed oil may be added to the above compositions in order to obtain better flowing of solutions on the metal tape.

*Example 4*

In the procedure according to Example 1, the following dipping solution can be likewise employed:

(a) 4.0 kg. of a polyester from 0.5 mol of phthalic acid, 2.5 mols of adipic acid, 1 mol of 1,3-butylene glycol and 3 mols of trimethylol propane are dissolved in
  12.2 l. of ethyl acetate
  12.2 l. of toluene
  12.2 l. of cyclohexanone (b) 9.6 kg. of a reaction product of 1 mol of trimethylol propane and 3 mols of toluylene diisocyanate containing 30% of phenol are dissolved in
  12.2 l. of ethyl acetate
  12.2 l. of toluene
  12.2 l. of cyclohexanone This reaction mixture can be likewise diluted with a solvent mixture according to Examples 2 and 3 in order to obtain any desired thickness of films. Stoving temperature 270° C.

Since both the starting materials and the plastic foil being formed therefrom are polar, on account of their chemical structure, they have a very high bonding strength with supports. It is thus not possible to use the conventional process for the manufacture of foils, in which material is continuously cast on an endless band as supporting foundation, the film being automatically detached. It is not possible for the film to be detached mechanically from the supporting foundation without the said film being damaged.

It is not possible to roll out the material to a foil on a calander, since the cross-linked final product of the polyaddition is not thermoplastic.

The manufacture is most expediently effected by a metallic support, preferably a metallic tape, for example, foil, being coated on one side or more economically on both sides with the components of the polyester-polyisocyanate addition product, for example, by the dipping process, the polyaddition expediently being carried out at relatively high temperatures in order to accelerate the process, whereupon the polyurethane film which is formed is stripped off by chemical agents. In this connection, it is important that those parts of the support, either the oxide layer or the metal itself, which come into contact with the film, should be dissolved.

As dielectrics the reaction product of polyfunctional isocyanates with polyhydroxy compounds are excellently suitable, because they display good adhesiveness on the metal foil and a high dielectric constant. As polyfunctional isocyanates, e.g. bivalent isocyanates, such as toluylene diisocyanate, or trivalent isocyanates, such as triphenyl methane-triisocyanate come in consideration. As trivalent isocyanates also the reaction product of 1 mol of a trivalent alcohol with 3 mols of a bivalent isocyanate may be used. As polyhydroxy compounds preferably branched polyesters containing hydroxyl groups as are obtainable by polycondensation of di-basic acids, such as adipic acid or phthalic acid with trivalent, or mixtures of bivalent and trivalent alcohols may be used. In the manufacture of these branched polyesters containing hydroxyl groups the number of hydroxyl groups should exceed the number of carboxyl groups. The branched polyesters containing hydroxyl groups are mostly oily substances or waxes with a low melting point. As polyhydroxy compounds also film-forming plastics containing hydroxyl groups, such as cellulose acetate or mixed polymerisates of vinyl chloride with vinyl alcohol come in consideration. In all instances reaction of these polyhydroxy compounds with polyfunctional isocyanates brings about that with the formation of urethane groups the molecules are enlarged and interlacing occurs. The proportion of interlacing and molecular increase can be regulated by varying the quantities of the starting material. Molecular increase is highest when placing one OH-group on one isocyanate group.

Suitable for stripping the polyurethane films off the metal tape are all chemical agents which more especially dissolve metal oxide skins situated between the film and the metal. Acids and more especially hydrofluoric acid, and alkalis, may be used in this respect. It is of course also possible for the metal support to be wholly or partially dissolved chemically, this being the case when, for example, a thin metallised paper or the like is used as support.

As the supporting metal, it is advantageous to use an aluminum foil, while an acid, preferably hydrofluoric acid, is used for the chemical stripping operation. All metals which naturally have an oxide layer on the surface, such as aluminum, or on which such a layer may easily be produced, as on copper, are particularly suitable for this purpose. It has been established that the acids, more especially a solution of a hydrofluoric acid of less than 1%, so quickly dissolves the oxide between the metal and the plastic foil and thus permits the plastic foils to be lifted that there is scarcely any chemical action on the pure metal. The foil-supporting layer is therefore conducted through an acid bath, and then through a cold or moderately heated water bath, which may be neutral or slightly alkaline, the detached foils and the metal band are then separated from one another in suitable devices, whereupon the said foils are passed through a drying device and reeled.

Figure 2:
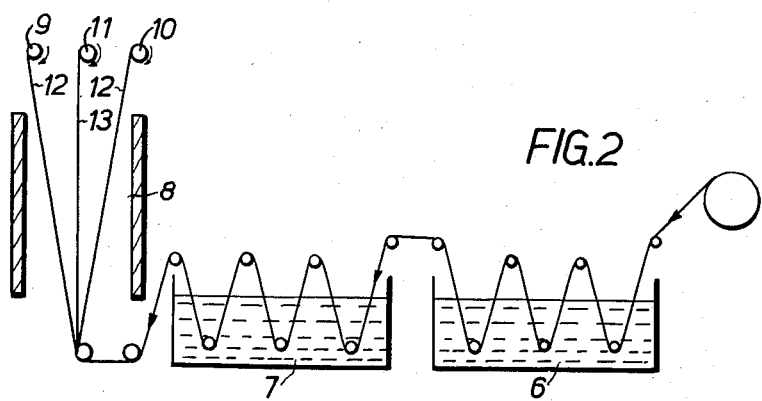

In the accompanying drawing the procedure of the present invention is described in detail, more specifically, Fig. 1 shows the procedure of covering the metal tape with polyurethane foils, and Fig. 2 refers to the stripping of the polyurethane foils off the metal tape.

Figure 3:
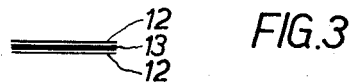

According to Fig. 1 a metal tape 12 for instance 5–6μ in thickness is wound off 1 and brought by reels 2 into a dipping bath 3 containing the polyurethane forming compositions described for instance in the Examples 1–4. The covered metal tape (shown in Fig. 3) is passed through vertical drying channels 4 at temperatures rising from 150°–300° C., whereby polycondensation to the plastic takes place on the metal surface. The procedure of dipping and drying can be repeated several times to enlarge the thickness of the foils. On the other hand, the thickness of the foil can be varied to the desired degree by varying the running time of the tape. It is to be noted that the slower is the running speed the thinner is the foil produced. Finally, the polyurethane covered metal tape is reeled, 5.

Now, according to Fig. 2, the polyurethane covered metal tape is passed through an acid bath 6, containing for instance a 1% solution of hydrofluoric acid, and through a washing bath 7. The polyurethane foils 13 are thereby stripped off the metal tape 12 and after passing through the stoving channel 8, reeled on the rolls 9, 10 and 11, respectively.

I claim:

1. A process for the production of unsupported polyurethane films which comprises applying a polyhydroxy compound and an organic polyisocyanate to a support comprising a metal layer, said compound being brought into contact with said metal layer, and heating the resulting mixture to effect chemical reaction between the said components and form a solid polyurethane, and thereafter separating the said polyurethane film from the said support by dissolving only the surface of the support in contact with the film in a solvent therefor.

2. The process of claim 1 wherein said metal is aluminum and the solvent is hydrofluoric acid.

3. The process of claim 1 wherein the said mixture is heated to a temperature of from about 150° C. to about 300° C.

4. The process of claim 1 wherein the said support comprises a metal layer supported on a paper base.

References Cited in the file of this patent

UNITED STATES PATENTS

| | | |
|---|---|---|
| 2,520,173 | Sanders | Aug. 29, 1950 |
| 2,593,829 | Arledter et al. | Apr. 22, 1952 |
| 2,631,334 | Bailey | Mar. 17, 1953 |
| 2,639,252 | Simon et al. | May 19, 1953 |
| 2,668,168 | Pikl | Feb. 2, 1954 |
| 2,682,024 | Kohman et al. | June 22, 1954 |
| 2,697,740 | Novak | Dec. 21, 1954 |
| 2,750,437 | Olson et al. | June 12, 1956 |
| 2,755,266 | Brenschede | July 17, 1956 |
| 2,760,953 | Seeger | Aug. 28, 1956 |
| 2,777,831 | Seeger | Jan. 15, 1957 |